(12) United States Patent
Mayer et al.

(10) Patent No.: US 6,460,405 B1
(45) Date of Patent: Oct. 8, 2002

(54) METHOD FOR MEASURING GAS LEAKAGE FROM SEALED PACKAGES

(75) Inventors: Daniel W. Mayer, Wyoming; Robert L. Demorest, Maple Grove; John Bode, Eden Prairie, all of MN (US)

(73) Assignee: Mocon, Inc., Minneapolis, MN (US)

( * ) Notice: Subject to any disclaimer, the term of this patent is extended or adjusted under 35 U.S.C. 154(b) by 0 days.

(21) Appl. No.: 09/676,621

(22) Filed: Oct. 2, 2000

(51) Int. Cl.[7] .................................................. G01M 3/04
(52) U.S. Cl. ........................... 73/40.7; 73/49.3; 73/52
(58) Field of Search ............................. 73/49.5, 40.7, 73/52

(56) References Cited

U.S. PATENT DOCUMENTS

| | | | |
|---|---|---|---|
| 3,762,212 A | * 10/1973 | Morley et al. | 73/37 |
| 5,345,814 A | * 9/1994 | Cur et al. | 73/49.3 |
| 5,728,929 A | * 3/1998 | Gevaud | 73/19.12 |
| 5,939,619 A | 8/1999 | Achter et al. | |
| 6,050,133 A | 4/2000 | Achter et al. | |

* cited by examiner

Primary Examiner—Hezron Williams
Assistant Examiner—Michael Cygan
(74) Attorney, Agent, or Firm—Paul L. Sjoquist

(57) ABSTRACT

A non-destructive method for testing sealed packages for leakage, particularly packages having a gas-permeable portion and a non-gas-permeable portion, by applying a temporary barrier over the gas-permeable portion, wherein the temporary barrier has two apertures, and enclosing the package in a testing chamber having a carrier gas flowing through it to a detector, and passing a tracer gas through the package interior via the two apertures in the temporary barrier.

11 Claims, 1 Drawing Sheet

METHOD FOR MEASURING GAS LEAKAGE FROM SEALED PACKAGES

BACKGROUND OF THE INVENTION

The present invention relates to a method for measuring the amount of gas that leaks through sealed packages. More specifically, the invention relates to gas leakage through packages that have been sealed by a cover of porous material fabricated as a mat of polyethelene fibers. This material acts as a permeable membrane to gases, but an impermeable membrane to bacteria. The membrane comprises a layer having pores which provide a tortuous path to the passage of bacteria; the material is commonly sold under the trademark designation "TYVEC." The packages which use this material are typically semi-rigid plastic cases which protect medical devices and appliances after manufacture and before actual use.

The invention relates to U.S. Pat. No. 5,939,619, issued Aug. 17, 1999, entitled "Method and Apparatus for Detecting Leaks in Packaging," and U.S. Pat. No. 6,050,133, issued Apr. 18, 2000, entitled "Method and Apparatus for Detecting Leaks in Packaging." Both of these patents are owned by the assignee of the present invention. The present invention permits a much faster measurement of leakage than either of the foregoing prior art patents, with high sensitivity and less possibility of destroying the test package.

Gas sterilization is widely used for medical devices that must be sterile at the time of use, but cannot be subjected to sterilization by the application of high temperatures. Examples of such medical devices include cardiac pacemakers and catheter-based monitoring devices such as blood pressure probes. Typically, the medical device is sealed within a package that is permeable to gases but impermeable to bacteria. The package is then placed in a gas sterilization chamber, and a sterilizing gas such as ethylene oxide is introduced into the gas-permeable package to achieve sterilization. The sterilizing gas is then removed from the package, leaving the interior of the package sterile and non-toxic.

In a typical design, the medical device is placed within a thermoformed rigid plastic tray equipped with a flat sealing flange. A sheet of gas-permeable membrane, such as DuPont TYVEK® 1073-B (medical grade) brand membrane, which is available from E.I. duPont de Nemours & Co., is then sealed to the sealing flange, typically by using an adhesive. The integrity of the seal is critically important to maintaining sterility. Leaks can result from incorrect setting of parameters in the automated sealing process, or from physical defects such as burrs on the face of the sealing equipment.

According to the known practice described in the prior art patents listed herein, a temporary barrier is formed over the gas-permeable layer, wherein the temporary barrier has an aperture with the gas-permeable layer to temporarily seal the gas-permeable layer except where the aperture is located. A tracer gas is applied under low pressure through the aperture so that it can enter into the interior chamber of the package. The entire package is placed into a larger sealed second chamber, and the concentration of tracer gas in the second chamber is measured, outside the package, to thereby measure the amount of tracer gas which has leaked through the package, presumably via leaks in the sealing flange, although leakage can also occur through pinhole defects in the plastic tray itself.

One problem which exists with the methods described in the foregoing patents is that necessarily only very small concentrations of tracer gas can be introduced into the package, and therefore only very, very small concentrations of tracer gas must be measured to determine whether there is a leakage condition. The typical package used for containing medical devices is formed from rigid plastic material, and only about 3 to 5 psig pressure can be applied before the pressure will burst the seals of the package. This means that only about 2 cc of tracer gas can be delivered into a package having a volume of about 200cc, which provides only a low concentration of tracer gas into the package, and a much lower concentration of leakage tracer gas for measurement outside the package. This increases the sensitivity requirements of the measuring instruments and increases the time required for a successful measurement to be made; both are factors which increase the cost of testing.

SUMMARY OF THE INVENTION

The present invention comprises a method for testing sealed packages of the type described herein for leakage, according to a more efficient and faster process than is known in the prior art. The method requires a barrier layer to be overlaid on the gas-permeable membrane of the package, the barrier layer having two apertures to the gas-permeable membrane. The package is placed into a test chamber with the two apertures protruding outside the chamber, the chamber also having a carrier gas inlet and a carrier gas outlet. The carrier gas inlet is initially blocked and a slight vacuum is applied to the carrier gas outlet. After a few seconds, the tracer gas flow is started through the package apertures, passing through the permeable membrane, to thereby provide a continuous flow of tracer gas through the package undergoing test. The carrier gas outlet is then connected to a detector and the carrier gas inlet is opened to carrier gas at ambient pressure, resulting in a surge of carrier gas through the test chamber, which picks up trace amounts of the tracer gas, if any tracer gas leaks from the package, and the carrier gas, with its contained tracer gas, is conveyed to a suitable detector, capable of providing a measurement signal corresponding to the amount of tracer gas which is detected.

It is a principal object and advantage of the present invention to provide a method for measuring leakage through packages under faster test conditions than have heretofore been known.

It is another object and advantage of the present invention to provide a leakage test method which does not destroy the package being tested.

Other and further objects and advantages of the invention will become apparent from the following specification and claims and with reference to the appended drawings.

DESCRIPTION OF THE PREFERRED EMBODIMENT

Figure 1:
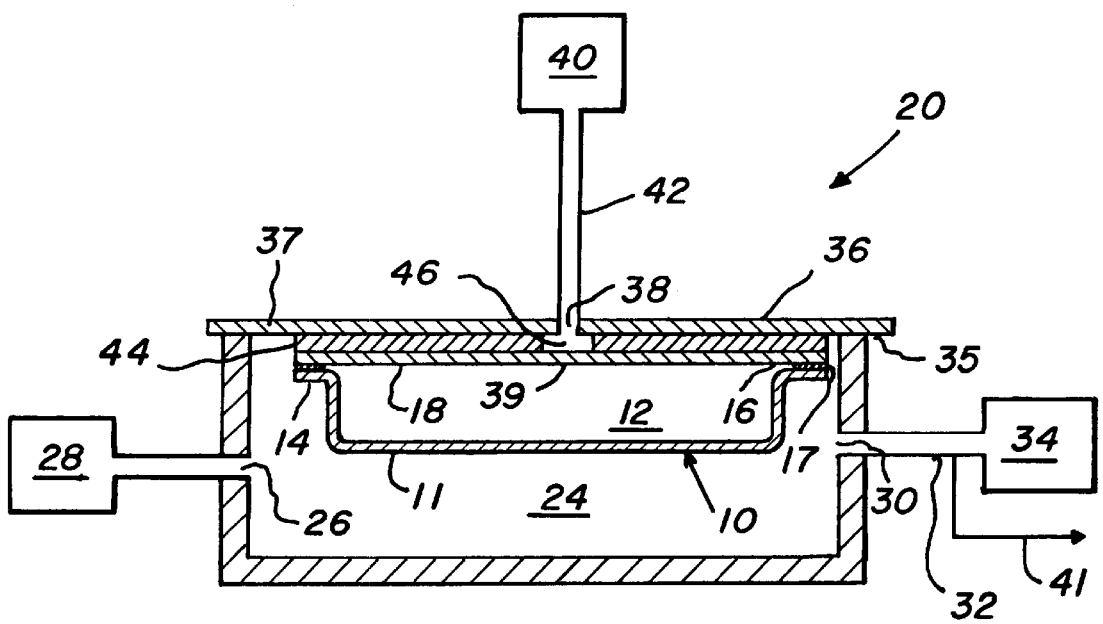
FIG. 1 shows a cross section view of an apparatus for practicing the method of the prior art.

Referring to the drawing figures, it should be understood that the test apparatus shown in each figure does not form a part of the present invention, and that the drawings are not necessarily to scale. Reference to the drawings enables a better understanding of the methods of the prior art and of the present invention, and particularly to show the principles of the present quantities from chamber 24, and a suitable carrier gas can be any gas, such as air or nitrogen, which is suitable for carrying tracer gas to a detector without affecting the tracer gas measurement capabilities of the detector. The housing 22 also has an outlet 30 which is connected to a suitable detector 34, via a conduit 32. The detector 34 may be a coulox detector or any other type of detector for the tracer gas being used, and may include a mass spectrometer or infrared gas detector. The conduit 32 has a vent exit 41 for selectively removing purge gas from the testing apparatus. The housing 22 has a removable cover 36 which provides a seal 35 to enclose chamber 24. The cover 36 has an aperture 38 which is connectable via conduit 42 to a source 40 of tracer gas.

Prior to inserting the package 10 into chamber 24, a temporary barrier layer 44 is applied between the cover 36 and the membrane 18, either by adhering the temporary barrier layer 44 to the underside of cover 36 or to the top surface of membrane 18. In either event, the layer 44 has an aperture 46 which is aligned with aperture 38 of cover 36, for delivery of tracer gas to the exposed portion 39 of the gas-permeable membrane 18, and all of the remaining surface area of membrane 18 is covered by layer 44.

One preferred material for barrier layer 44 is a gas-impermeable tape with a thin coating of adhesive, to bond to the gas-permeable membrane 18 to seal without voids or gaps. When the tape is removed after testing, the adhesive remains with the tape, leaving little or no residue on the surface of the gas-permeable sheet 18.

According to the method of the prior art, the package 10 is placed into chamber 24 of the testing apparatus 20, and the chamber 24 is then purged of all residue gases. The purge gas is then stopped and the tracer gas is applied invention and its advantages over the prior art method. In the figures, like reference characters refer to the same or functionally similar parts of the respective devices illustrated in each of the figures.

Referring first to FIG. 1, a prior art apparatus is shown which is useful for practicing the leakage testing method of the prior art, as described in U.S. Pat. No. 6,050,133. A leak detection apparatus 20 has confined therein a sealed package 10 which is positioned for leakage testing. The sealed package 10 includes a tray 11, a sealing flange 14 with an adhesive sealant 16 applied thereto and a gas-permeable sheet or membrane 18 affixed to the sealing flange 14 by the sealant 16, all enclosing an interior chamber 12. The sealant 16 has an external edge 17 which forms a sealing bead around the perimeter of the flange 14 and the perimeter of the gas-permeable sheet or membrane 18. As described hereinbefore, the gas-permeable membrane is a porous membrane formed of a thermoplastic or paper that allows passage through the membrane of a gas but not larger particles, such as dust, bacteria, etc. In one embodiment of a sealed package that the present method is usefully applied to, the gas-permeable membrane 18 is a mat of polyolefin fibers available from duPont under the trademark TYVEK. Typically, the gas-permeable membrane 18 has a thickness in the range of between about 0.127 and 0.254 millimeters.

The leak detection apparatus 20 has a housing 22 which encloses a chamber 24, of sufficient size for holding the package. The housing 22 is made from metal or other non-gas-permeable material. The housing 22 has an inlet 26 which is connected to a source 28 of carrier gas and/or a source of purge gas. A suitable purge gas can be air, nitrogen, or any other gas which can purge tracer gas into conduit 42 at a pressure of between about 0.5 and 1.0 psig, until the pressure in package chamber 12 is equalized with the tracer gas pressure. The package 10 is maintained within the testing apparatus chamber 24 for a predetermined length of time to allow the concentration of tracer gas to build up within the chamber 24 if any leaks are present in the package 10. The concentration of tracer gas is then conveyed from chamber 24 to a detector 34 where it is measured, preferably by a trace gas analyzer using a mass spectrometer or other suitable instrument. In a preferred embodiment, the mass spectrometer is a quadrupole residual gas analyzer tuned for helium, as the tracer gas. The analyzer is usually linked to a microcomputer (not shown) with a human interface such as a display panel, data storage, and programs to compare test data with control samples. However, tracer gases other than helium can be used; for example, if carbon dioxide is used as a tracer gas an infrared analyzer can be a suitable alternative to the mass spectrometer.

Figure 2:
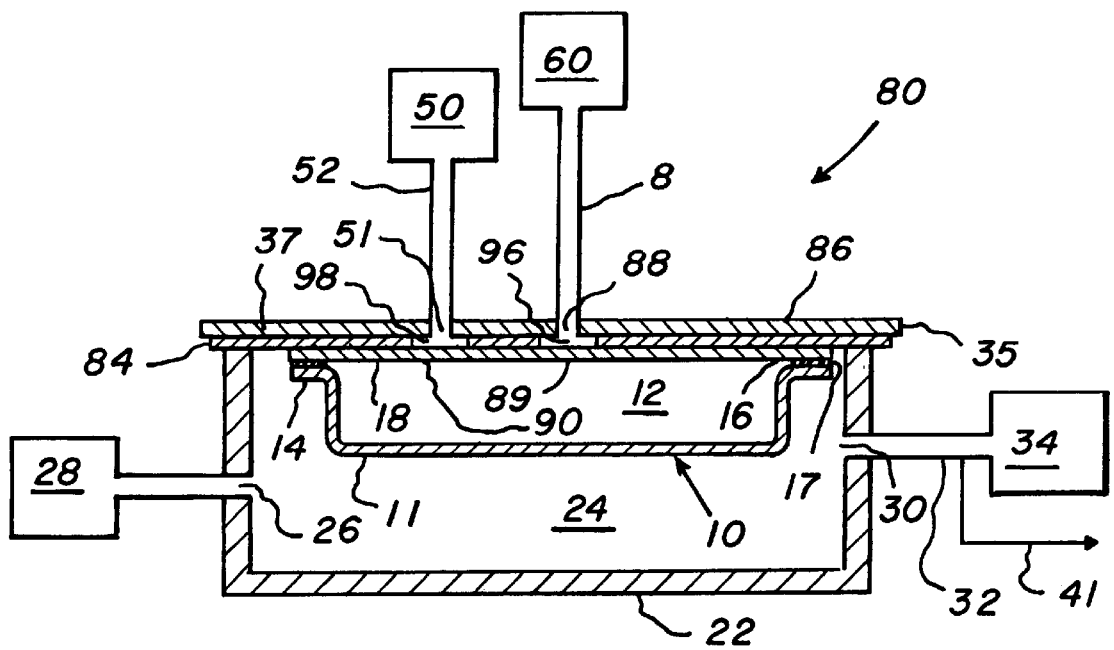
FIG. 2 shows a cross-section view of an apparatus for practicing the method of the present invention.

Referring to FIG. 2, a testing apparatus 80 is shown which is similar in many respects to the testing apparatus of FIG. 1. However, the cover 86 provides two apertures 51 and 88, wherein the aperture 88 is connected via a conduit 82 to a source 60 of tracer gas, and the aperture 51 is connected via a conduit 52 to an exhaust device 50. A temporary barrier layer 84 is applied between the cover 86 and the membrane 18 in a manner as earlier described. The layer 84 has an aperture 96 which is aligned with cover aperture 88, and an aperture 98 which is aligned with cover aperture 51. Tracer gas is delivered from source 60 to the exposed portion 89 of membrane 18, and tracer gas is removed from within chamber 24 via the exposed portion 90 of membrane 18, through aperture 51 and conduit 52 to exhaust device 50. In this manner, a continuous flow of tracer gas is maintained into an through the interior chamber 12, thereby allowing a more rapid delivery of tracer gas to the interior of the package under lower pressure conditions. The faster delivery of tracer gas into the package 10 permits a more rapid leakage, should any leaks exist, and thereby provides a greater and faster buildup of tracer gas in chamber 24. This tracer gas is picked up by the carrier gas flowing through chamber 24, as earlier described, and results in a much faster measurement by the detector 34.

The steps of the method include placing the package 10 into the testing apparatus 80 with the temporary barrier layer applied as shown, sealing the cover 86 against the housing 22. The carrier gas inlet is blocked, and a slight vacuum of 0.5 to about 1.0 psig is applied to the carrier gas outlet for about ten seconds, thereby purging the residual gas from chamber 24. Next, the gas conduits to the apertures into the package are opened to a flow of tracer gas for up to about thirty seconds, thereby introducing a flow of tracer gas through the package interior. Finally, the carrier gas outlet is connected to the detector and the carrier gas inlet into chamber 24 is opened to ambient pressure, causing a "slug" of carrier gas to enter the chamber and passing the carrier gas through the chamber 24 to pick up tracer gas concentrations, for delivery to the detector. The detector measures and registers a signal representative of the tracer gas concentration level in this "slug" of carrier gas. This process permits a much faster and greater buildup of tracer gas in chamber 24 than heretofore possible, and provides a leakage measurement in a much shorter period of time. The process also lowers the pressure stress internal to the package and thereby reduces the possibility that the testing procedure may contribute to the development of leaks through pressure buildup.

The present invention may be embodied in other forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. A non-destructive method for testing for leakage in a sealed package having an interior chamber formed of a gas-permeable portion and a non-gas-permeable portion, comprising the steps of:
   a) forming a temporary barrier having a first and second aperture to the gas-permeable portion to temporarily seal the gas-permeable portion except at said first and second apertures;
   b) enclosing said sealed package in a testing chamber with said first and second apertures exposed to the exterior of said testing chamber, said testing chamber further having third and fourth apertures respectively connectable to a source of carrier gas and a tracer gas detector;
   c) applying a tracer gas through said first aperture at said gas-permeable portion and exhausting said tracer gas through said second aperture at said gas-permeable portion, whereby a flow of said tracer gas passes through said interior chamber; and
   d) applying a flow of carrier gas through said testing chamber third and fourth apertures to said tracer gas detector, whereby said detector measures the amount of tracer gas removed from said testing chamber.

2. The method of claim 1, wherein the tracer gas is chemically inert with the materials making up said package.

3. The method of claim 2, wherein the tracer gas is selected from a group consisting of helium and carbon dioxide.

4. The method of claim 1, wherein the temporary barrier includes a sheet having a removable adhesive on at least one side.

5. The method of claim 1, wherein the gas-permeable portion of said package is formed with a material selected from the group consisting of paper and a polyolefin mat.

6. The method of claim 1, wherein the non-gas-permeable portion of said package is formed from a polymer selected from the group consisting of polyethylene, polypropylene, polyvinyl chloride and polyethylene terepthalate.

7. The method of claim 1 wherein the atmosphere in said testing chamber is purged with a purge gas prior to applying said tracer gas.

8. The method of claim 7, wherein said purge gas further comprises nitrogen.

9. A method for testing for leakage in a sealed package having an interior chamber formed of a gas-permeable portion and a non-gas-permeable portion, comprising the steps of:
   a) forming a temporary barrier having a first and second aperture to the gas-permeable portion to temporarily seal the gas-permeable portion except at said first and second apertures;
   b) enclosing said sealed package in a testing chamber with said first and second apertures exposed to the exterior of said testing chamber, said testing chamber further having a third aperture connectable to a source of carrier gas and a fourth aperture connectable to either a vacuum source or a tracer gas detector;
   c) applying said vacuum source to said fourth aperture for a predetermined first time interval;
   d) applying a tracer gas through said first aperture at said gas-permeable portion and exhausting said tracer gas through said second aperture at said gas-permeable portion, whereby a flow of said tracer gas passes through said interior chamber;
   e) applying said fourth aperture to a tracer gas detector, and applying said carrier gas source to said third aperture, thereby causing a flow of carrier gas through said testing chamber to said tracer gas detector, whereby said detector measures the amount of tracer gas removed from said testing chamber by said carrier gas.

10. The method of claim 9, wherein said first time interval is less that thirty seconds.

11. The method of claim 9, wherein said tracer gas is carbon dioxide gas, and said detector is an infrared gas detector.

* * * * *

UNITED STATES PATENT AND TRADEMARK OFFICE
CERTIFICATE OF CORRECTION

PATENT NO.    : 6,460,405 B1
DATED         : October 8, 2002
INVENTOR(S)   : Mayer et al.

It is certified that error appears in the above-identified patent and that said Letters Patent is hereby corrected as shown below:

The pages of the filed patent application are printed out of sequence in the printed patent. The proper page sequence is:

1) Column 1, line 1, to Column 3, line 3, through "of the present"

2) Column 3, line 36, beginning with "invention" through
   Column 4, line 1, through "tracer gas"

3) Column 3, line 3, beginning with "quantities from chamber 24" through
   Column 3, line 36, ending with "tracer gas is applied"

4) Column 4, line 1, beginning with "into conduit 42" through the end
   of the patent.

Signed and Sealed this

First Day of April, 2003

JAMES E. ROGAN
*Director of the United States Patent and Trademark Office*